(12) United States Patent  (10) Patent No.: US 8,873,795 B2
Yamamoto  (45) Date of Patent: Oct. 28, 2014

(54) IMAGE EDITING APPARATUS, IMAGE EDITING METHOD AND STORAGE MEDIUM

(75) Inventor: Noriyuki Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 931 days.

(21) Appl. No.: 12/748,740

(22) Filed: Mar. 29, 2010

(65) Prior Publication Data

US 2010/0246996 A1   Sep. 30, 2010

(30) Foreign Application Priority Data

Mar. 31, 2009   (JP) ................................. 2009-086154

(51) Int. Cl.
 *G06K 9/00* (2006.01)
 *G06T 11/60* (2006.01)
(52) U.S. Cl.
 CPC ...................................... G06T 11/60 (2013.01)
 USPC ......................................... 382/100; 382/293
(58) Field of Classification Search
 USPC .............................................. 382/100, 293
 See application file for complete search history.

(56) References Cited

FOREIGN PATENT DOCUMENTS

| JP | 3780601 | * | 5/2006 | ............. G06F 3/033 |
| JP | 3780601 B2 | | 5/2006 | |
| JP | 2007-041944 A | | 2/2007 | |

OTHER PUBLICATIONS

Japanese Patent JP3780601 (JP10214350) to Iijima Jun, machine translation from Japanese Patent website.*

* cited by examiner

*Primary Examiner* — Wesley Tucker
(74) *Attorney, Agent, or Firm* — Canon USA, Inc. IP Division

(57) ABSTRACT

A method that, when an image is edited by moving objects, causes a display apparatus to display a layout image in which a plurality of objects is arranged, sets a region containing specified objects in the displayed layout image based on positions where each of the specified objects is arranged in the layout image, determines a position to which the object of the specified objects is to be moved in the layout image according to the set region, and moves the object of the specified objects to the determined position.

20 Claims, 11 Drawing Sheets

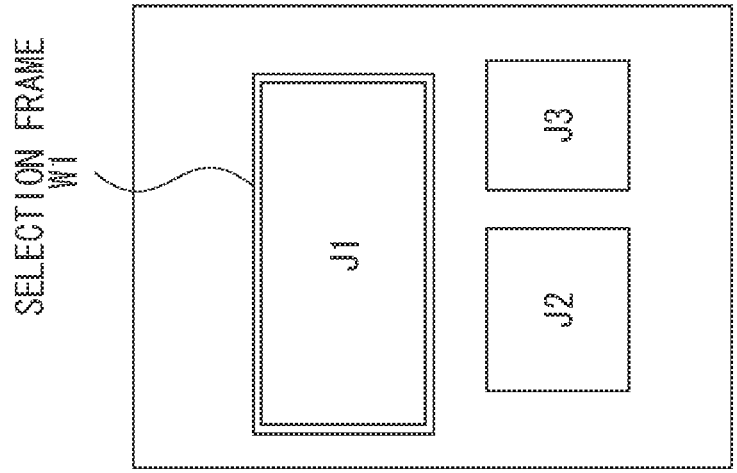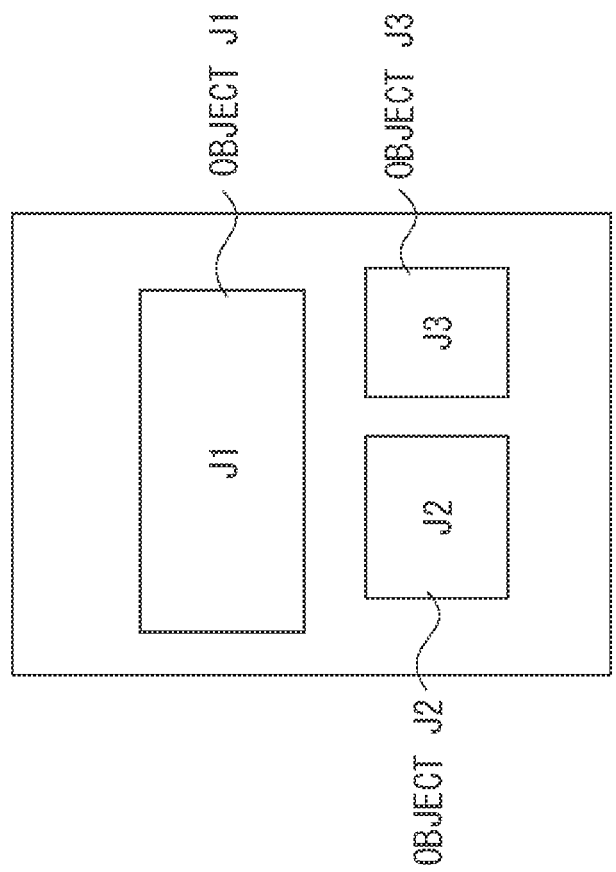

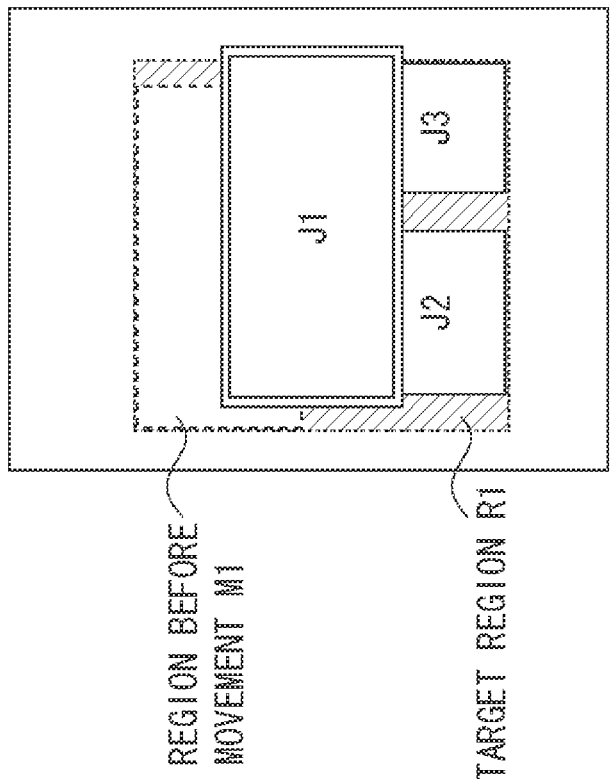

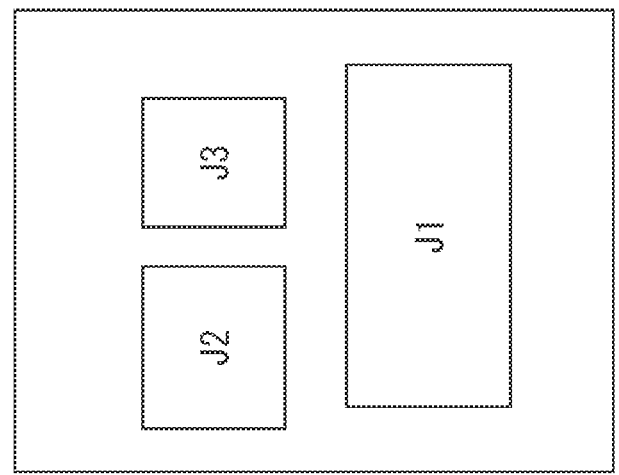
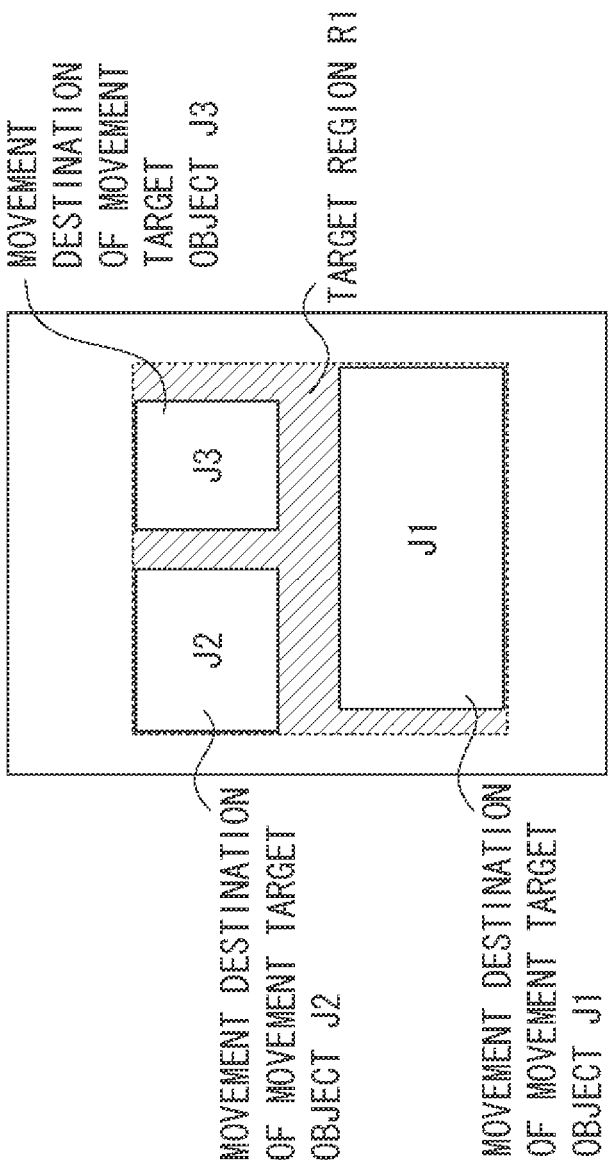

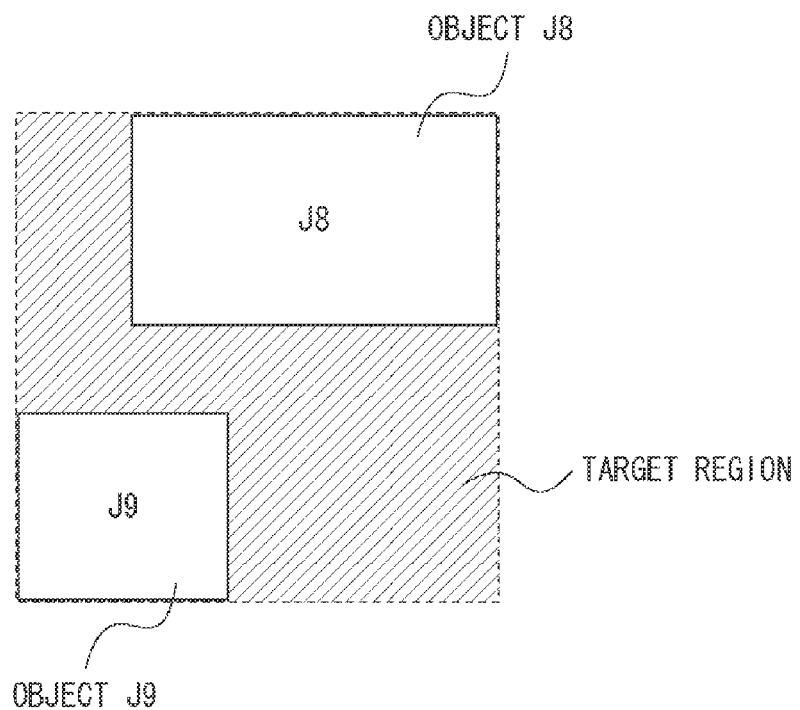
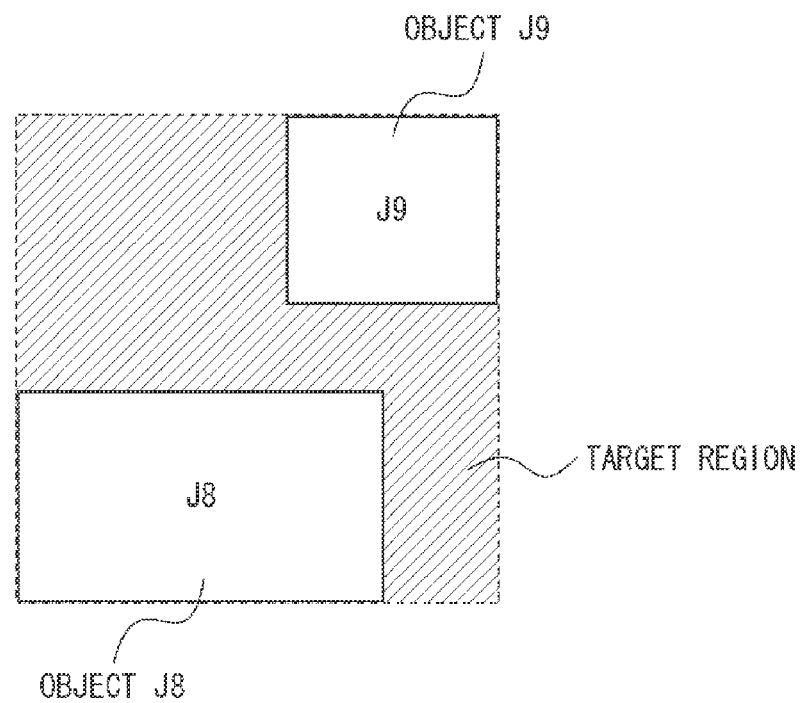

IMAGE EDITING APPARATUS, IMAGE EDITING METHOD AND STORAGE MEDIUM

BACKGROUND OF THE INVENTION

1. Field of the Invention

The present invention relates to an image editing apparatus to create image data in which objects, an image editing method, and a storage medium.

2. Description of the Related Art

A technique to move an object in a displayed image is known, by which a screen displays an image in which objects such as text and images are arranged, and a user selects the object to be moved by a pointing device such as a mouse and performs a drag operation on the object. Thus, a means for accurately aligning the position of an object to be moved to a desired position is to be used. As such a means, a method is known by which the screen displays a line called a guide for aligning the object position. More specifically, the screen is configured to movably display respective guides in the longitudinal direction and the lateral direction and the user sets the desired position by moving the guides to indicate the desired position. Then, an object is moved to align the object with the guides. If, for example, positions of objects should be interchanged, the objects can be interchanged to accurate positions by setting the guides that indicate object positions.

However, this method may have a number of issues. For example, in the method for interchanging positions by moving objects using a unit for assisting the movement of objects such as a guide, the guide is set to a desired position. Thus, if many objects should be interchanged continuously, the guide is to be reset many times, so that the user is to perform many operations.

Japanese Patent No. 3780601 discusses a method for interchanging the position and size of each image by dragging one selected image onto another object (see FIG. 4A).

However, according to this method, while positions of two images can be interchanged, there may be an issue that the object size is also changed even if the user only desires to move objects. Particularly when the aspect ratio of images is different between images, a portion of an image or display an image with a white space is to be cut, so that the user may not be able to obtain a desired result.

SUMMARY OF THE INVENTION

According to an aspect of the invention, an apparatus includes a display control unit configured to cause a display apparatus to display a layout image in which a plurality of objects is arranged, a setting unit configured to set a region containing specified objects in the displayed layout image, based on positions where each of the specified objects is arranged in the layout image, a determining unit configured to determine a position to which an object of the specified objects is to be moved in the layout image, according to the set region, and a control unit configured to move the object of the specified objects to the determined position.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A, 4B, 4C, 4D, 4E, and 4F are diagrams illustrating images displayed in the processing for interchanging objects.

FIGS. 8A and 8B are diagrams illustrating the displays when objects are interchanged in the vertical and horizontal directions.

DESCRIPTION OF THE EMBODIMENTS

Various exemplary embodiments, features, and aspects of the invention will be described in detail below with reference to the drawings.

Figure 1:
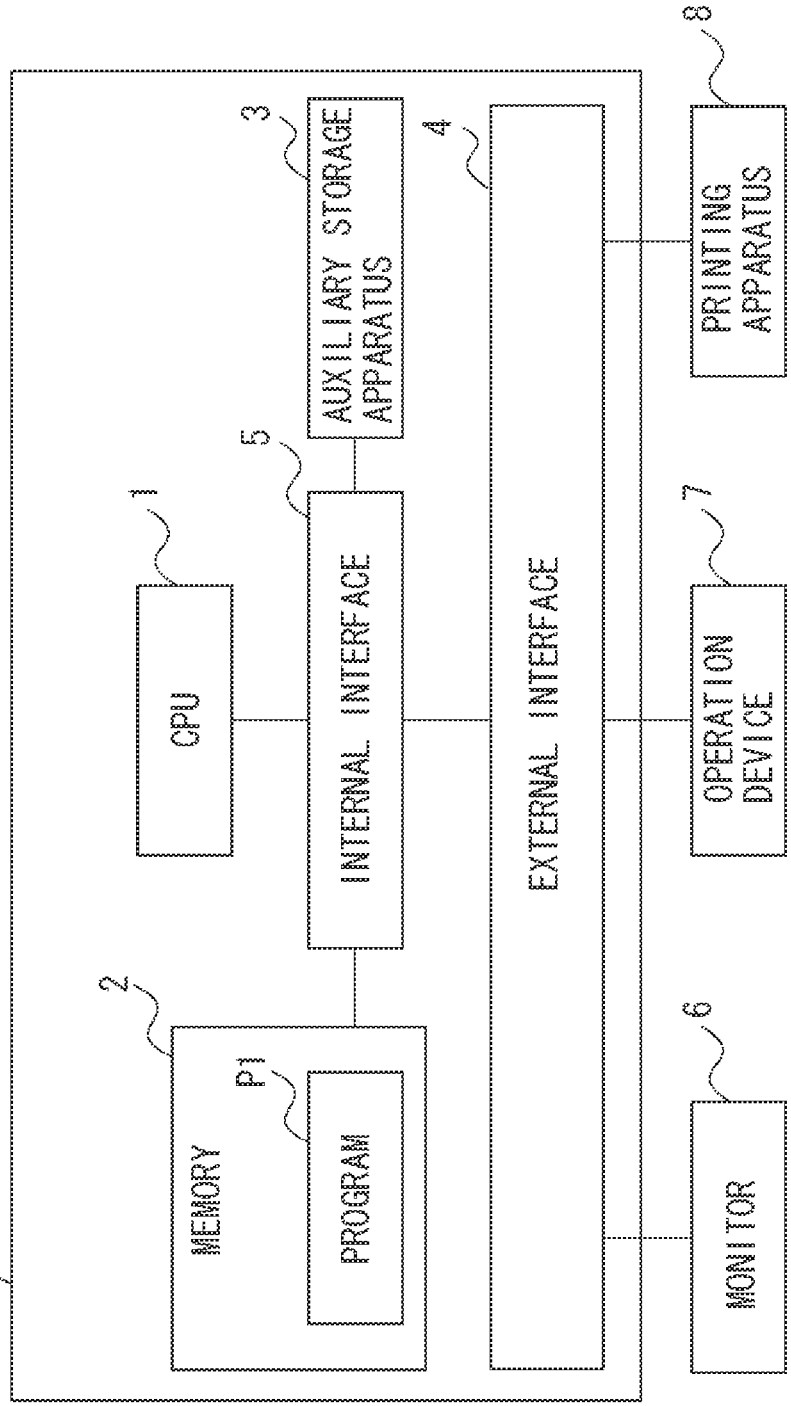
FIG. 1 is a block diagram illustrating a configuration of an image editing apparatus in the present exemplary embodiment.

FIG. 1 is a block diagram illustrating the configuration of an image editing apparatus 100 in the present exemplary embodiment. The image editing apparatus 100 is an apparatus to generate image data in which objects are arranged. The image editing apparatus 100 includes a central processing unit (CPU) 1, a memory 2, an auxiliary storage apparatus 3 such as a hard disk drive, and an external interface 4, and each unit is connected by an internal interface 5. Further, a monitor 6, an operation device 7 such as a mouse and keyboard, and a printing apparatus 8 can be connected to the image editing apparatus 100 via the external interface 4.

The CPU 1 issues processing commands to each unit and performs processing of various kinds of data to control the entire system. The auxiliary storage apparatus 3 has a program P1 stored in advance showing processing content performed by the CPU 1 and the program P1 is loaded into the memory 2 for execution. The CPU 1 can exercise control by executing the program P1 loaded into the memory 2. The monitor 6 is a display apparatus such as a liquid crystal display (LCD) monitor and a cathode-ray tube (CRT) monitor and notifies the user of information by displaying operation commands or results. If the user operates the operation device 7 such as a mouse or keyboard, operation content thereof is input into the CPU 1 via the external interface 4 and the internal interface 5. Then, the CPU 1 exercises control according to the operation content, so that a user's command can be input via the operation device 7. The printing apparatus 8 can print an image on a recording medium such as recording paper.

Figure 2:
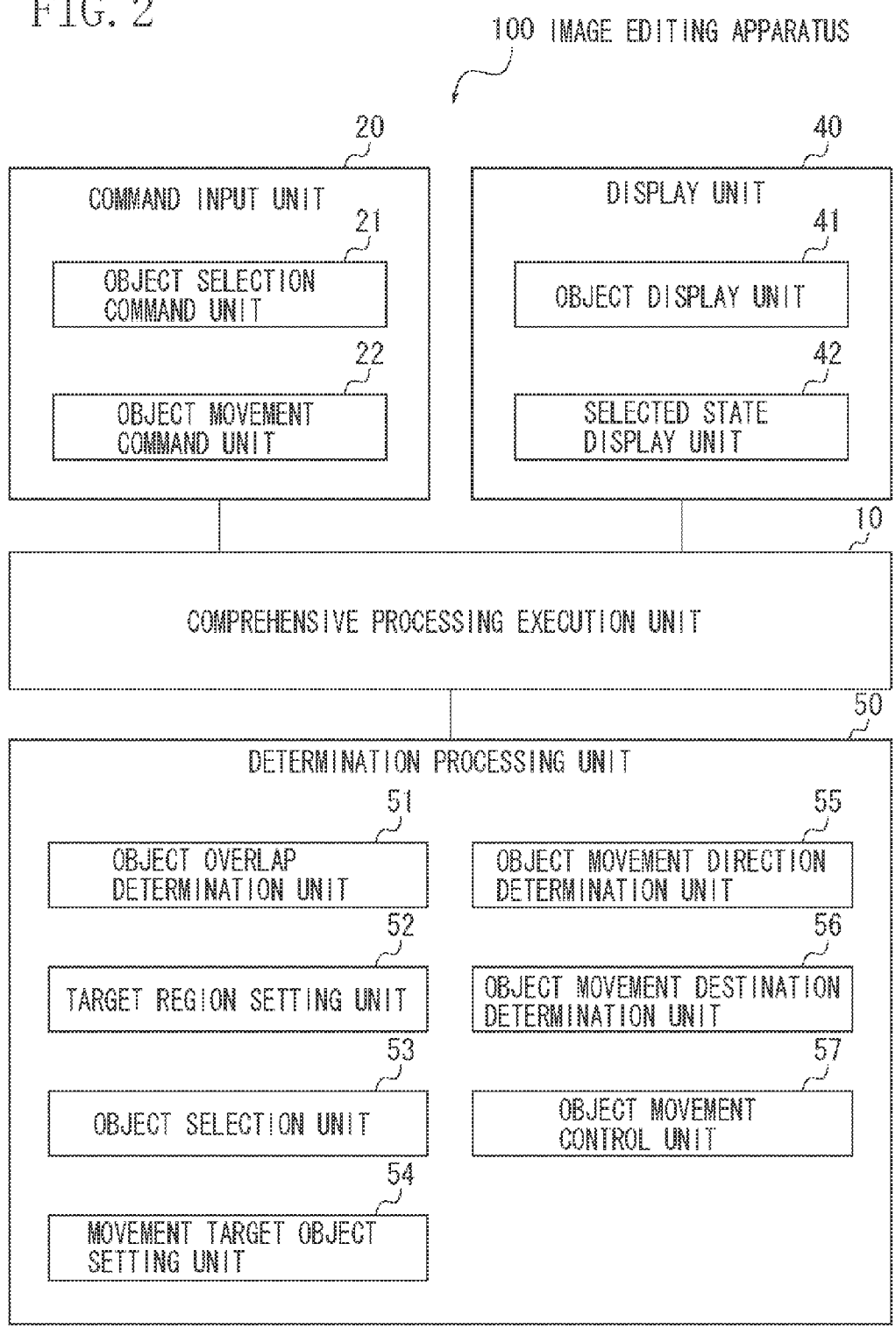
FIG. 2 is a block diagram illustrating a functional configuration of the image editing apparatus.

FIG. 2 is a block diagram illustrating the functional configuration of the image editing apparatus 100. A comprehensive processing execution unit 10 carries out comprehensive management such as data transfer to perform various kinds of processing, and execution by each control unit to arrange objects by the image editing apparatus. A command input unit 20 has information indicating content of an operation performed on the operation device 7 input thereinto to determine a command corresponding to the operation, and notifies the comprehensive processing execution unit 10 of the determined command. If the determined command is the one to select an object, an object selection command unit 21 makes a notification thereof. On the other hand, if the determined command is the one to move an object, an object movement command unit 22 makes a notification thereof.

A display unit 40 exercises display control to cause the monitor 6 to display an image. An object display unit 41 displays an object in the monitor 6. On the other hand, a selected state display unit 42 makes a display in the monitor 6 indicating that an object is selected.

A determination processing unit 50 makes various determinations regarding arranged objects and performs various kinds of processing. An object overlap determination unit 51 determines whether arranged objects overlap with each other. A target region setting unit 52 sets a target region where objects are interchanged. The target region will be described in detail below. An object selection unit 53 puts an object specified by the object selection command unit 21 into a selected state. A movement target object setting unit 54 sets an object overlapping with a selected object to a movement target object. An object moving direction determination unit 55 determines the direction in which to move an object within a target region. An object movement destination determination unit 56 determines an object movement destination that is a position after an object is moved. An object movement control unit 57 moves an object to an object movement destination.

Figure 3:
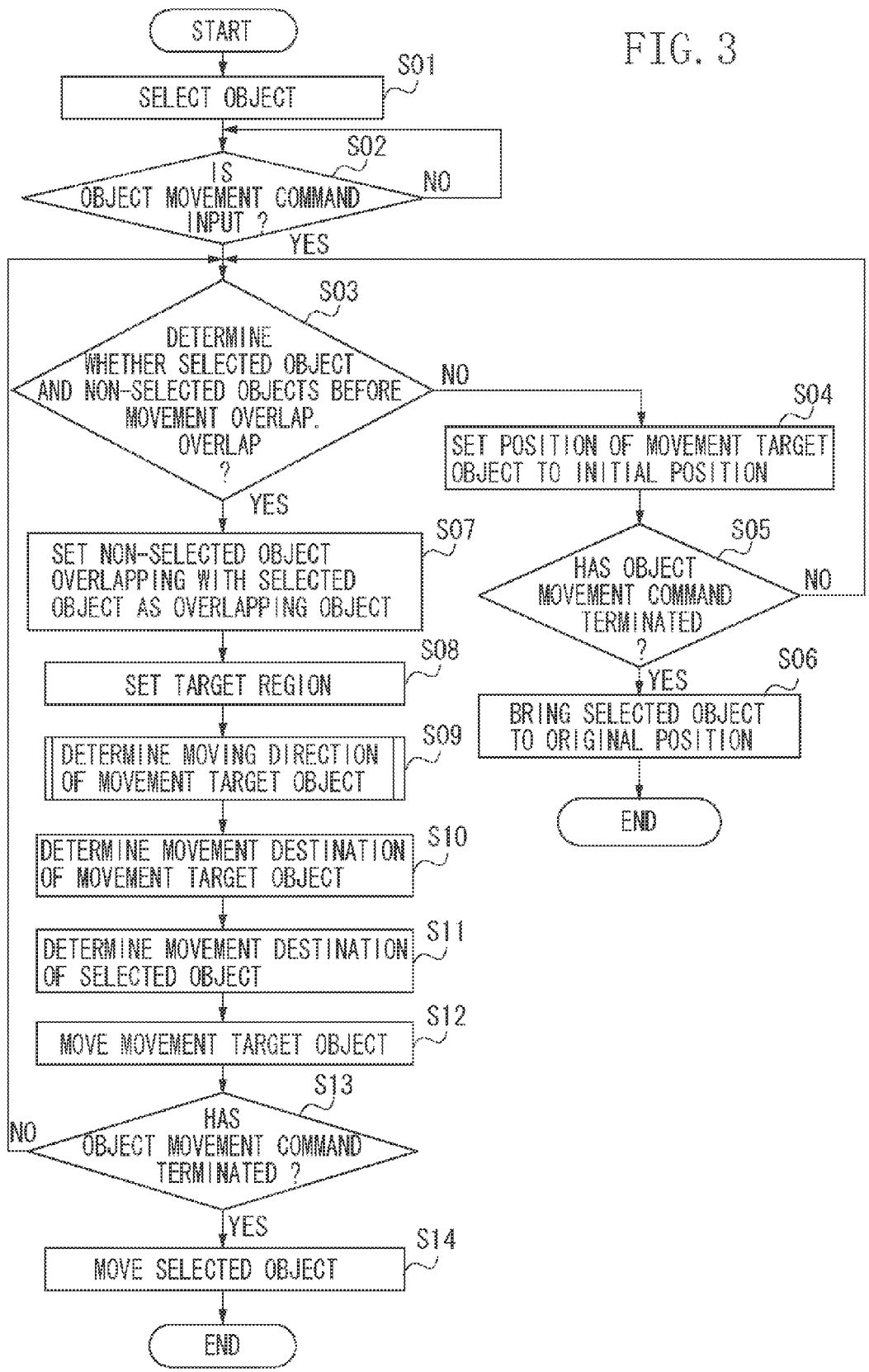
FIG. 3 is a flow chart illustrating processing for interchanging objects.

Next, operations of the present exemplary embodiment will be described. FIG. 3 is a flow chart illustrating processing to interchange objects. More specifically, it is a sequence of processing, in which an object is selected, the selected object is moved, and an object at a position of movement destination is also moved until objects are eventually interchanged. The comprehensive processing execution unit 10 is always executed to carry out comprehensive management such as data transfer to perform various kinds of processing and execution of each control unit, and therefore, will not be specifically described below.

FIGS. 4A to 4F illustrate diagrams illustrating images displayed in processing to interchange objects and the flow illustrated in FIG. 3 is started when an image is in a state illustrated in FIG. 4A. FIG. 4A is a diagram illustrating an image (first image) before objects are interchanged and objects J1 to J3 are arranged in the displayed image. Causing the object display unit 41 to display this image may be termed the first display control. In the following description, the object J1 of these objects is moved to interchange with the objects J2 and J3.

In step S01, when a command to select the object J1 is input from the object selection command unit 21, the object selection unit 53 puts the object J1 into a selected state. For example, a command of selection can be issued by the user specifying an object displayed in the monitor 6 with a mouse. Further, the selected state display unit 42 makes a display indicating that the object J1 is in a selected state. FIG. 4B is a diagram illustrating the display when an object is selected. A selection frame W1 indicating that the object J1 is in a selected state is displayed. This selected object may be termed the first object. When a plurality of objects is selected, a minimum rectangle containing the plurality of selected objects becomes the selected object (first object).

In step S02, it is determined whether a command to move the object J1 is input from the object movement command unit 22 and if no such command is input, processing returns to step S02. For example, a command of movement can be issued by a drag operation performed after the user specifies an object by mouse clicking. If a movement command is input, the object movement control unit 57 moves the object J1 (first movement control) and the object display unit 41 displays the object J1 before proceeding to step S03. In step S03, whether the object selected in step S01 and currently moving is overlapping with other non-selected objects (second objects) is determined by the object overlap determination unit 51.

FIG. 4C is a diagram illustrating a state in which the selected object overlaps with non-selected objects during movement. In FIG. 4C, the moving object J1 overlaps with the non-selected objects J2 and J3. A region M1 before the movement is a region where the object J1 has been arranged before the movement. If a determination is made in step S03 that there is no overlap, processing proceeds to step S04. In step S04, positions of non-selected objects to be printed are set to the initial positions to be selected in step S01. In other words, non-selected objects may be moved from the initial positions in step S01 as movement target objects by processing described below. In such a case, processing to bring non-selected objects back to the original positions in step S01 is performed.

Next, in step S05, it is determined whether the command to move the object from the object movement command unit 22 has terminated. More specifically, it is determined whether the user has performed an operation on the operation device 7 to move the object J1. For example, if the user moves an object by performing a drag operation after clicking, whether the user has clicked is determined. If the user has not clicked, the command of movement can be considered to have terminated. If the operation of movement has terminated, processing proceeds to step S06 to bring the selected object to the original position in step S01 and the processing ends. On the other hand, if the operation of movement has not terminated in step S05, processing returns to step S03. In step S06, the position of the selected object may also be determined based on the position at that time.

In step S07, the object J2 and the object J3 overlapping with the moving selected object J1 are set by the movement target object setting unit 54 as movement target objects. Thus, if the selected object overlaps with a plurality of objects, a minimal rectangle containing the plurality of objects overlapping with the selected object becomes a movement target object. Next, in step S08, a target region is set by the target region setting unit 52. The target region is set based on the region of the selected object before the movement and the region of the movement target object. FIG. 4D is a diagram illustrating a target region. As illustrated in FIG. 4D, a target region R1 becomes the target in the present exemplary embodiment. The target region R1 is a rectangle region in which the region M1 before the movement, the movement target object J2, and the movement target object J3 are inscribed. Objects will be interchanged within the rectangle region of R1.

In step S09, the moving direction of the movement target object J2 and the movement target object J3 is determined by the object moving direction determination unit 55. The moving direction of an object includes an upward or downward movement as a movement in the longitudinal direction and a leftward or rightward movement as a movement in the lateral direction. The movement is one of a movement only in the longitudinal direction, a movement only in the lateral direction, and a movement in both the longitudinal and lateral directions. The moving direction of the selected object is the one opposite to the moving direction of a movement target object. The method for determining the moving direction of an object will be described in detail below. In the present exemplary embodiment, the movement target object J2 and the movement target object J3 are moved upward and leftward, and the selected object J1 downward and rightward.

Next, in step S10, the movement destination of the movement target object J2 and the movement target object J3 is determined by the object movement destination determination unit 56. In step S11, the movement destination of the selected object J1 is determined by the object movement destination determination unit 56.

FIG. 4E is a diagram illustrating the movement destinations in the target region R1 of the movement target objects and the selected object. In this case, the movement target object J2 and the movement target object J3 are considered as a single object. More specifically, processing is performed in such a way that an object having the size of a minimal rectangle containing the two objects is moved upward and leftward while being inscribed in the target region R1. As a result, the movement destination is determined while relative positions of the movement target object J2 and the movement target object J3 are maintained.

On the other hand, the position after the selected object J1 is moved downward and rightward while being inscribed in the target region R1 becomes the movement destination of the selected object J1. If there is a plurality of selected objects, these objects are considered as a single object and thus, the plurality of selected objects is moved while relative positions thereof are maintained.

Next, in step S12, the movement target object J2 and the movement target object J3 are moved by the object movement control unit 57 to the movement destination determined in step S10 (second movement control). In step S13, like step S05, it is determined whether the command to move the object from the object movement command unit 22 has terminated. In other words, it is determined whether the user has performed an operation on the operation device 7 to move the object J1. More specifically, it is determined whether an operation to move the objects has terminated while at least a portion of the selected object J1 is overlapping with the region (second region) where the movement target object J2 and the movement target object J3 were arranged before being moved.

If a determination is made that the operation to move objects has terminated, processing proceeds to step S14. In step S14, the selected object J1 in process of moving is moved by the object movement control unit 57 to the movement destination determined in step S11 and the processing ends. FIG. 4F is a diagram illustrating an image (second image) in which positions of the objects are interchanged by the flow chart in FIG. 3 and an image in which the selected object and movement target objects are moved is displayed by the object display unit 41. Causing the object display unit 41 to display this image may be termed the second display control.

On the other hand, if a determination is made in step S13 that the operation to move objects has not terminated, processing returns to step S03 to determine again whether the selected object is overlapping with the region where non-selected objects were arranged before being moved. If a determination is made that the selected object is not overlapping, the movement target objects moved in step S12 may be brought back to the original positions thereof.

In the present flow chart, after the movement target objects is moved in step S12, whether the command to move objects has terminated is determined in step S13. However, the order of processing may be reversed such that after a determination is made that the command to move objects has terminated, the movement target objects is moved. However, the user who performs processing in the order illustrated in FIG. 3 can terminate the operation to move objects after verifying a result of movement of the movement target objects.

Next, the method for determining the moving direction of an object described in step S09 in FIG. 3 will be described in detail. In the method for determining the moving direction of an object, it is determined in which direction to move the object to be moved within a target region. One method will be described below as the method for determining the moving direction of an object, but the method for determining the moving direction of an object is not limited to this.

Figure 5:
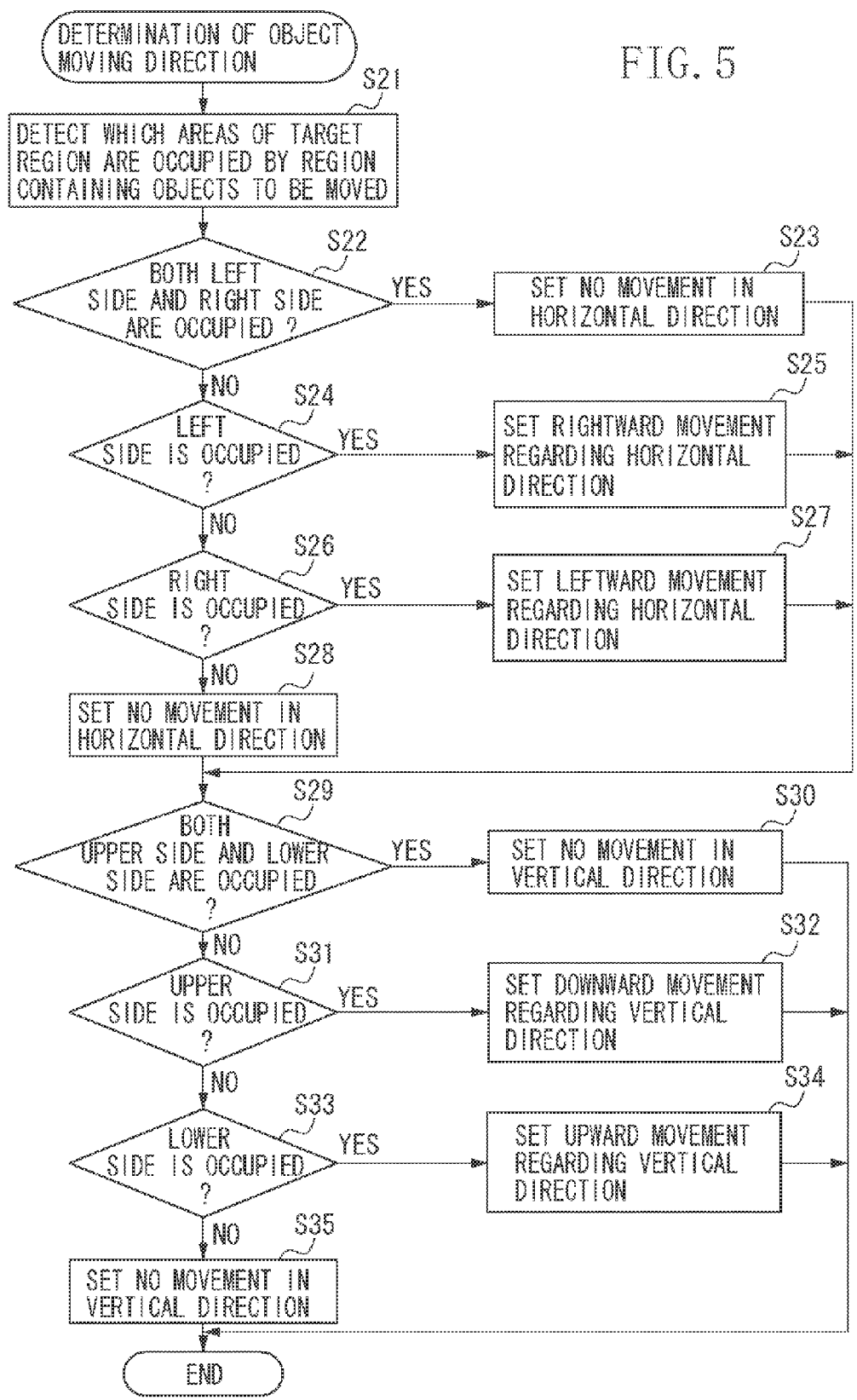
FIG. 5 is a processing flow of a method to determine a moving direction of an object.

FIG. 5 is a flow chart illustrating processing to determine the moving direction of an object by the object moving direction determination unit 55. In step S21, it is detected which side of a target region is occupied by a minimal rectangle region containing objects to be moved. However, the object may be in a complex shape, or rotated to have a side that is not parallel to a side of the target region. In such a case, a minimal rectangle region that contains objects and is occupied by sides parallel to those of the target region is set as an object region. Each of four sides of the rectangle region is in contact with objects.

Next, in step S22, whether the right and left sides are occupied by the minimal rectangle region is first determined and if both the right and left sides are occupied by the minimal rectangle region, processing proceeds to step S23 to make a setting that there is no movement in the horizontal direction. On the other hand, if both the right and left sides are not occupied by the minimal rectangle region, processing proceeds to step S24 to determine whether only the left side is occupied by the minimal rectangle region. If only the left side is occupied by the minimal rectangle region, processing proceeds to step S25 to make a setting to move only rightward regarding the horizontal direction.

On the other hand, if a determination is made that the left side is not occupied by the minimal rectangle region, processing proceeds to step S26 to determine whether only the right side is occupied by the minimal rectangle region. If only the right side is occupied by the minimal rectangle region, processing proceeds to step S27 to make a setting to move only leftward regarding the horizontal direction. If a determination is made that the right side is not occupied by the minimal rectangle region, the right and left sides of objects are namely not in contact with the target region and thus, a setting of no movement in the horizontal direction is made in step S28.

In steps S29 to S35, processing similar to that in steps S22 to S28 is performed. In step S29, it is determined first whether both the upper and lower sides are occupied by the minimal rectangle region and if both the upper and lower sides are occupied by the minimal rectangle region, processing proceeds to step S30 to make a setting that there is no movement in the vertical direction.

On the other hand, if both the upper and lower sides are not occupied by the minimal rectangle region, processing proceeds to step S31 to determine whether only the upper side is occupied by the minimal rectangle region. If only the upper side is occupied by the minimal rectangle region, processing proceeds to step S32 to make a setting to move only downward regarding the vertical direction.

On the other hand, if a determination is made that the upper side is not occupied by the minimal rectangle region, processing proceeds to step S33 to determine whether only the lower side is occupied by the minimal rectangle region. If only the lower side is occupied by the minimal rectangle region, processing proceeds to step S34 to make a setting to move only upward regarding the vertical direction. If a determination is made that the lower side is not occupied by the minimal rectangle region and therefore, the upper and lower sides of objects are not in contact with the target region, a setting of no movement in the vertical direction is made in step S35.

Next, the movement destination is determined based on which side of a target region is occupied by a selected object and a movement target object will be described. In this description, movement of the objects within a target region containing these objects when two objects are interchanged, will be described. When one of the two objects becomes the selected object, the other object may be considered to be the movement target object. More specifically, when there is a plurality of selected objects, a region containing these objects may be considered as a single selected object. Similarly, when there is a plurality of movement target objects, a region containing these objects may be considered as a single movement target object.

Figure 6A:
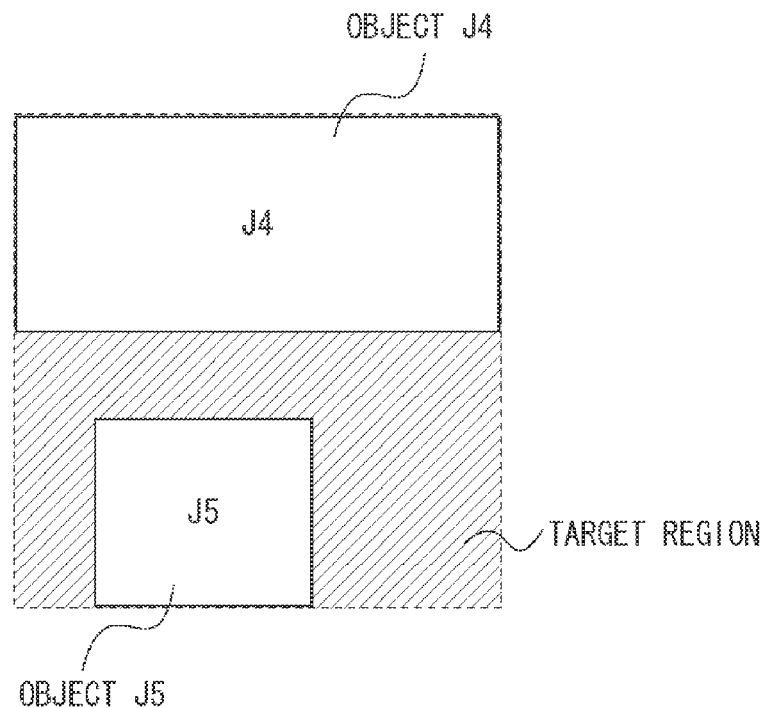
FIGS. 6A and 6B are diagrams illustrating displays when objects are interchanged in a vertical direction.
Figure 6B:
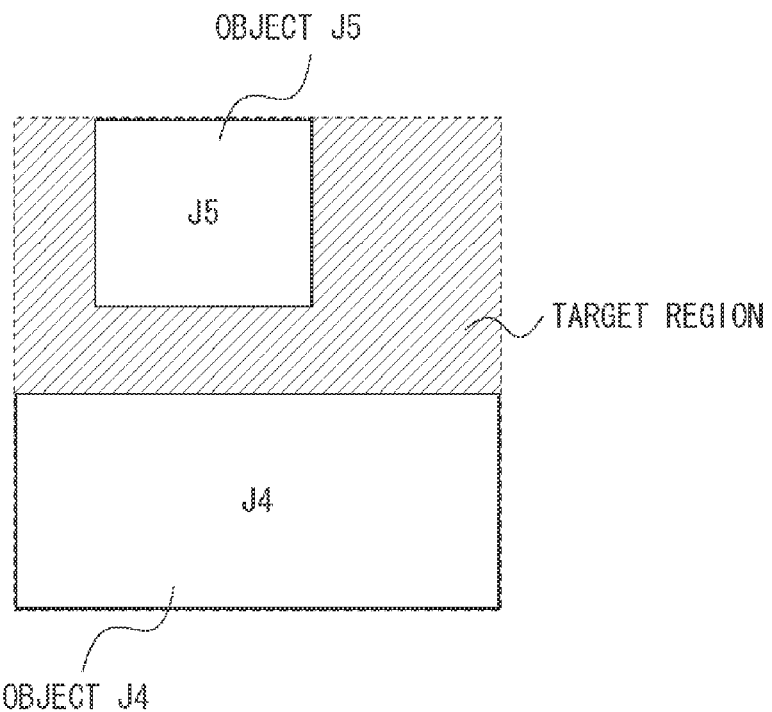

FIG. 6 is a diagram illustrating the display when objects are interchanged in the vertical direction. In FIG. 6A, an object J4 occupies the upper side, left side, and right side of the target region, and an object J5 occupies only the lower side. In this case, as illustrated in FIG. 6B, the object J5 moves upward and the object J4 moves downward and there is no movement in the lateral direction.

Figure 7A:
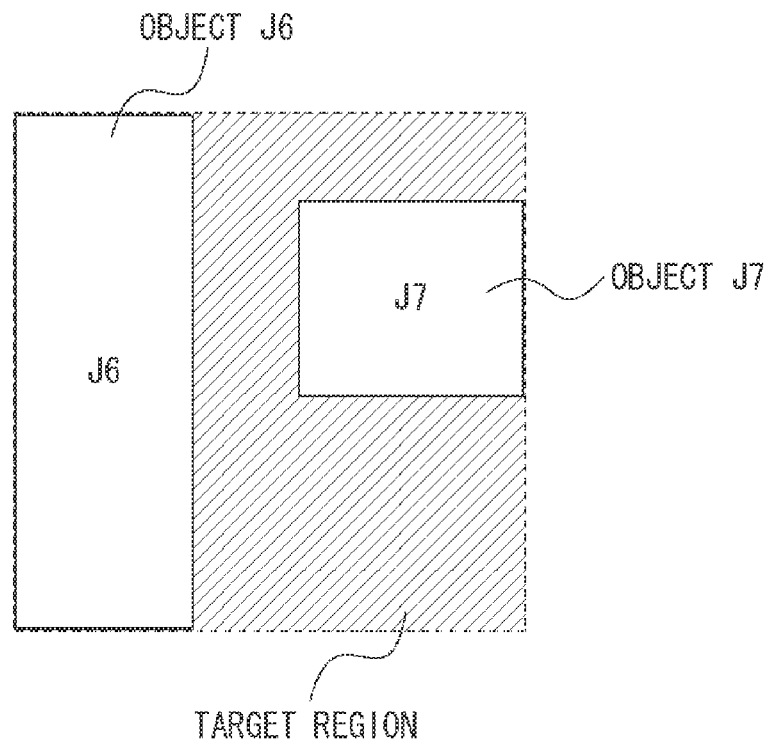
FIGS. 7A and 7B are diagrams illustrating the displays when objects are interchanged in a horizontal direction.
Figure 7B:
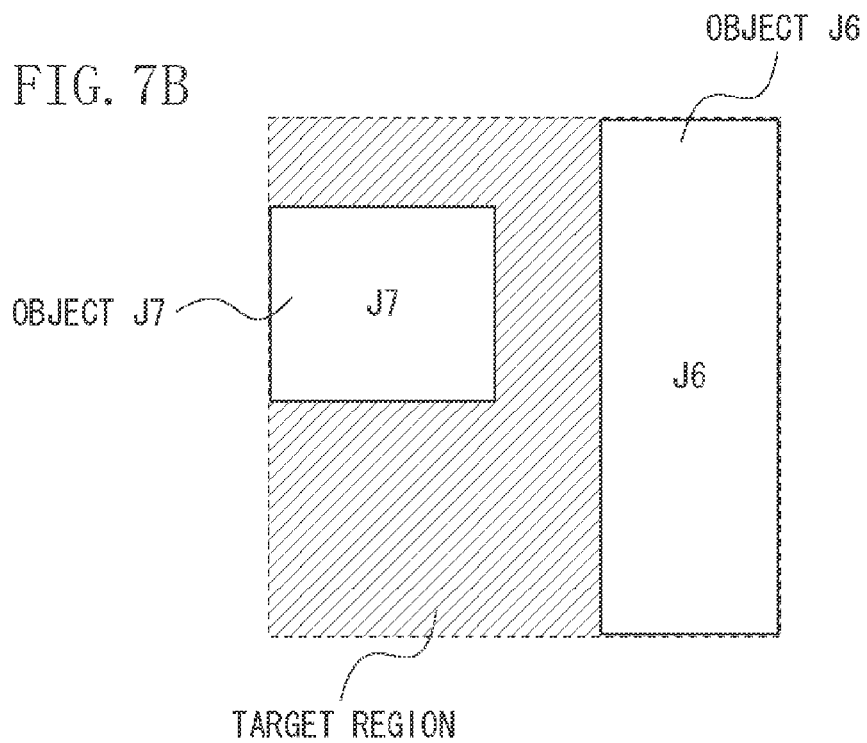

FIG. 7 is a diagram illustrating the display when objects are interchanged in the horizontal direction. In FIG. 7A, an object J6 occupies the upper side, lower side, and left side of the target region, and an object J7 occupies only the right side. In this case, as illustrated in FIG. 7B, the object J6 moves rightward and the object J7 moves leftward and there is no movement in the longitudinal direction.

FIG. 8 is a diagram illustrating the display when objects are interchanged in both the vertical and horizontal directions. In FIG. 8A, an object J8 occupies the upper side and right side of the target region, and an object J9 occupies the lower side and left side. In this case, as illustrated in FIG. 8B, the object J8 moves downward and leftward and the object J9 moves upward and rightward. More specifically, in FIGS. 6 to 8, objects move in such a way that the objects are inscribed in sides opposite to those initially in contact of the target region.

Figure 9A:
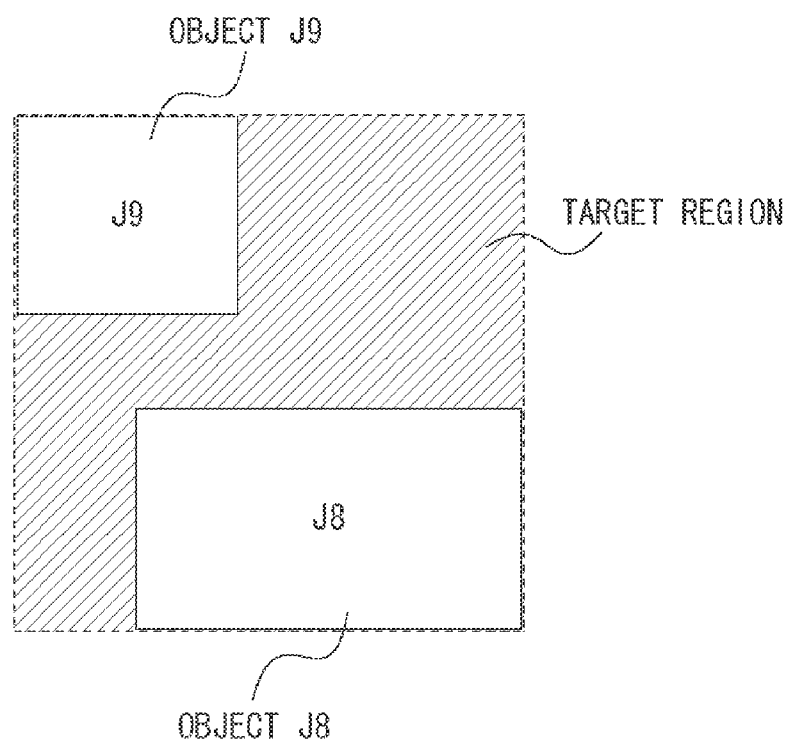
FIGS. 9A and 9B are diagrams illustrating the displays when objects are moved by restricting the direction.
Figure 9B:
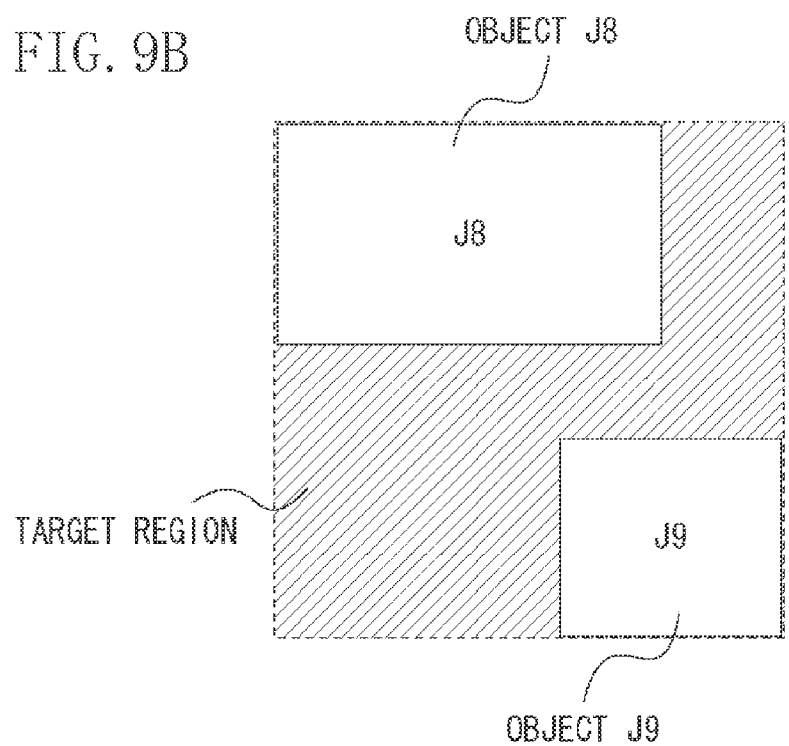

If objects are arranged as illustrated in FIG. 8A, movement may intentionally be limited to only one of the longitudinal and lateral directions. For example, by using the SHIFT key of the keyboard of the operation device 7 concurrently, movement may be limited to only the longitudinal direction or lateral direction. FIG. 9 is a diagram illustrating the display when objects are moved while restricting the direction. More specifically, if objects in FIG. 8A are restricted to movement in the longitudinal direction, movement as illustrated in FIG. 9A is obtained. If objects in FIG. 8A are restricted to movement in the lateral direction, movement as illustrated in FIG. 9B is obtained. As illustrated in FIGS. 6 to 9 above, each object moves in such a way that the object comes into contact with at least one side which is initially not in contact. More specifically, each object moves in such a way that the object is inscribed in at least one side of sides that are not shared by the target region R1 and the region where the object is initially arranged.

When the selected object is moved by the object movement command unit 22, movement target objects and movement results are frequently changed since overlapping objects are frequently changed. In such a case, an operation can be made easier to understand if movement from the position before movement of a movement target object to the movement destination is displayed with animation.

When the selected object is overlapping with a movement target object, there is a case where as a result of movement of the movement target object, the movement target object comes to overlap with an object (third object) other than the selected object and the movement target object. In such a case, the operation can be made easier to understand if the movement target object is displayed semi-transparently. However, in this case, the whole movement target object may be made semi-transparent or only an overlapping portion may be made semi-transparent. Alternately, the object with which the movement target object is overlapped may be made semi-transparent to place the object to the front of the movement target object. Further, the method is not limited to making an object transparent, but a method for simply changing the display color or a method for displaying only the frame of an object while the object is transparent, is also feasible.

According to the above exemplary embodiment, an object moved by a drag operation and objects overlapping with the object are selected as movement target objects. However, the method for specifying objects to be moved is not limited to this. For example, a plurality of objects specified by click operations of a mouse may be moved to interchange positions of these objects.

According to the above exemplary embodiment, objects can be interchanged at accurate positions only by selecting and moving an object to superimpose the object on an object with which positions should be interchanged. Thus, a unit for assisting the movement of objects such as a guide is not needed and object positions can be interchanged accurately by a simple operation. Moreover, when positions of a plurality of objects should be interchanged collectively, there is no need to repeat an interchange operation, so that an effect of preventing an operation from becoming cumbersome is achieved. Further, when a target region is displayed in interchanging positions, the user can recognize the range in which an object interchange takes place, in the displayed image.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-086154 filed Mar. 31, 2009, which is hereby incorporated by reference herein in its entirety.

What is claimed is:

1. An apparatus comprising:
   a display control unit configured to cause a display apparatus to display a layout image in which a plurality of objects are arranged;
   a setting unit configured to set a region, in the layout image displayed by the display control unit, containing a first object and a second object among the plurality of objects, based on positions where each of the first object and the second object is arranged in the layout image;
   a determining unit configured to determine, in a case where the region set by the setting unit corresponds to a part of the layout image, a position to which each of the first object and the second object is to be moved in the layout image, so that the moved first object and the moved second object are included in the region corresponding to the part of the layout image; and a control unit configured to move the first object and the second object to the positions determined by the determining unit.

2. The apparatus according to claim 1, further comprising a specifying unit configured to specify the first object and the second object to be moved from a plurality of objects included in the layout image as objects to be moved by the control unit, according to an instruction by a user.

3. The apparatus according to claim 2, further comprising:
a second control unit configured to move the first object in the layout image according to an instruction, wherein
the specifying unit specifies the first object and the second object which overlaps with the first object by movement of the first object by the second control unit, and
wherein the control unit moves the first object and the second object.

4. The apparatus according to claim 1, wherein the setting unit sets a rectangle region containing the first object and the second object with each of four sides in contact of at least one of the first object and the second object.

5. The apparatus according to claim 4, wherein the determining unit determines the position, so that each of the first object and the second object is inscribed in the rectangle region by any side of the four sides of the set rectangle region.

6. The apparatus according to claim 5, wherein the determining unit determines the position, so that each of the first object and the second object is inscribed in the rectangle region by the side opposite to the side which each of the first object and the second object is inscribed before the movement.

7. The apparatus according to claim 3, wherein in a case where the second object and a third object included in the layout image overlap with the first object by moving of the first object by the second control unit, the control unit moves the first object, the second object, and the third object so that a distance between the second object and the third object is kept.

8. The apparatus according to claim 3, wherein the setting unit sets the region containing the second object and the first object before the movement of the first object by the second control unit.

9. The apparatus according to claim 3, wherein the control unit moves the first object and the second object according to a termination of movement by the second control unit.

10. A method comprising:
causing a display apparatus to display a layout image in which a plurality of objects are arranged;
setting a region, in the layout image displayed by a display control unit, containing a first object and a second object among the plurality of objects, based on positions where each of the first object and the second object is arranged in the layout image;
determining, in a case where the region set by the setting corresponds to a part of the layout image, a position to which each of the first object and the second object is to be moved in the layout image, so that the moved first object and the moved second object are included in the region corresponding to the part of the layout image; and
moving the first object and the second object to the positions determined by a determining unit.

11. The method according to claim 10, further comprising specifying the first object and the second object to be moved from a plurality of objects included in the layout image as objects to be moved by a control unit, according to an instruction by a user.

12. The method according to claim 10, further comprising:
moving the first object in the layout image according to an instruction;
specifying the first object and a second object which overlaps with the first object by movement of the first object by a second control unit,
wherein the control unit moves the first object and the second object.

13. The method according to claim 10, wherein a rectangle region containing the first object and the second object with each of four sides in contact of at least one of the first object and the second object is set.

14. The method according to claim 13, wherein the position is determined, so that each of the first object and the second object is inscribed in the rectangle region by any side of the four sides of the set rectangle region.

15. The method according to claim 12, wherein in a case where the second object and a third object included in the layout image overlap with the first object by moving of the first object by the second control unit, the control unit moves the first object, the second object, and the third object so that a distance between the second object and the third object is kept.

16. A non-transitory computer readable storage medium storing a program to cause a computer to execute the image editing method according to claim 10.

17. The non-transitory computer readable storage medium according to claim 16, further comprising specifying the first object and the second object to be moved from a plurality of objects included in the layout image as objects to be moved by the control unit, according to an instruction by a use.

18. The non-transitory computer readable storage medium according to claim 16, wherein in a case where the second object and a third object included in the layout image overlap with the first object by moving of the first object by the second control unit, the control unit moves the first object, the second object, and the third object so that a distance between the second object and the third object is kept.

19. The non-transitory computer readable storage medium according to claim 16, wherein a rectangle region containing the first object and the second object with each of four sides in contact of at least one of the first object and the second object is set.

20. The non-transitory computer readable storage medium according to claim 19, wherein the position is determined, so that each of the first object and the second object is inscribed in the rectangle region by any side of the four sides of the set rectangle region.

* * * * *